(12) United States Patent
Warren, Jr. et al.

(10) Patent No.: US 11,144,310 B2
(45) Date of Patent: *Oct. 12, 2021

(54) SPAN LIMITED LEXICAL ANALYSIS

(71) Applicant: INTERNATIONAL BUSINESS MACHINES CORPORATION, Armonk, NY (US)

(72) Inventors: Claude N. Warren, Jr., Galway (IE); Andrew Lavelle, Knocknacarra (IE); Michael J. Ryan, Claregalway (IE); Emile-Hugo Spir, Issy-les-Moulineaux (FR)

(73) Assignee: International Business Machines Corporation, Armonk, NY (US)

( * ) Notice: Subject to any disclaimer, the term of this patent is extended or adjusted under 35 U.S.C. 154(b) by 101 days.

This patent is subject to a terminal disclaimer.

(21) Appl. No.: 16/592,953

(22) Filed: Oct. 4, 2019

(65) Prior Publication Data
US 2020/0034142 A1 Jan. 30, 2020

Related U.S. Application Data

(63) Continuation of application No. 15/849,812, filed on Dec. 21, 2017, now Pat. No. 10,585,664.

(51) Int. Cl.
*G06F 8/71* (2018.01)
*G06F 8/65* (2018.01)
*G06F 8/658* (2018.01)

(52) U.S. Cl.
CPC .................. *G06F 8/71* (2013.01); *G06F 8/65* (2013.01); *G06F 8/658* (2018.02)

(58) Field of Classification Search
CPC .................................. G06F 8/658; G06F 8/71
See application file for complete search history.

(56) References Cited

U.S. PATENT DOCUMENTS 5,479,654 A 12/1995 Mark
5,860,071 A 1/1999 Ball
(Continued)

FOREIGN PATENT DOCUMENTS

WO 2010017322 2/2010

OTHER PUBLICATIONS

Hitachi, "Job Management Partner 1 Version 10 Job Management Partner 1/Advanced Shell Description, User's Guide, Reference, and Operator's Guide", Jan. 2014, p. 1-10 (Year: 2014).*

(Continued)

*Primary Examiner* — Duy Khuong T Nguyen
(74) *Attorney, Agent, or Firm* — Schmeiser, Olsen & Watts; Michael A. Petrocelli

(57) ABSTRACT

A method and system for comparing at least two structured data files. A computer polls at least one network device for data files. The computer determines a structural difference between a first data file and a second data file and creates at least one patch file based on the structural difference. The computer extracts at least one span from the at least one patch file, wherein the at least one span is defined by a starting point byte and a length measured in bytes and creates an ordered listing. The computer performs a lexer operation using the at least one span as a limiting criterion to limit an output of the lexer to statements that include the at least one span. The computer outputs the statements indicating changes in a configuration between said first and second data files.

18 Claims, 5 Drawing Sheets

(56) References Cited

U.S. PATENT DOCUMENTS

| | | |
|---|---|---|
| 6,886,161 B1 | 4/2005 | Garvin |
| 7,392,471 B1 | 6/2008 | Ford |
| 8,032,860 B2 | 10/2011 | Worth |
| 8,862,555 B1 | 10/2014 | Qiuer |
| 2002/0010807 A1 | 1/2002 | Multer |
| 2003/0212712 A1 | 11/2003 | Jinsheng |
| 2006/0112152 A1 | 5/2006 | Napier |
| 2006/0218160 A1 | 9/2006 | Rishi |
| 2007/0299886 A1* | 12/2007 | Novak .................. G06F 16/178 |
| 2011/0238633 A1* | 9/2011 | Garandeau ............ G06F 16/219 |
| | | 707/690 |
| 2016/0139909 A1* | 5/2016 | Pospischil ................ G06F 8/65 |
| | | 717/173 |
| 2017/0279615 A1* | 9/2017 | Naik ....................... G06F 21/64 |
| 2019/0196809 A1 | 6/2019 | Warren, Jr. |

OTHER PUBLICATIONS

Ball, Thomas J. et al.; An Internet Difference Engine and its applications; Technologies for the Information Superhighway Digest of Papers Compcon 1996; Feb. 25-28, 1996; Abstract retrieved from the Internet Nov. 29, 2017; URL: http://ieeexplore.ieee.org/document/501751/; 3 pages.

Cisco; Managing Configuration Files Configuration Guide, Cisco IOS XE Release 3S; URL: http://www.cisco.com/c/en/us/td/docs/ios-xml/ios/config-mgmt/configuration/xe-3s/config-mgmt-xe-3s-book/cm-config-logger.html; retrieved from the Internet Nov. 29, 2017; 156 pages.

Dujack, Jared L.; List of IBM Patents or Patent Applications Treated as Related; 1 page.

IBM; Finding Configuration Changes in Delta Checkpoints; URL: http://www.ibm.com/support/knowledgecenter/SSAW57_8.5.5/com.ibm.websphere.nd.doc/ae/twve_checkpoint_changes.html; retrieved from the Internet Nov. 29, 2017; 16 pages.

* cited by examiner

SPAN LIMITED LEXICAL ANALYSIS

CROSS REFERENCE TO RELATED APPLICATIONS

This application is a continuation application claiming priority to Ser. No. 15/849,812 filed Dec. 21, 2017, now U.S. Pat. No. 10,585,664 issued Mar. 10, 2020, the contents of which are hereby incorporated by reference.

TECHNICAL FIELD

The present invention provides a lexical analysis that restricts output to statements that are of interest based on segmented portions selected from the input stream.

BACKGROUND

In computer science, lexical analysis is the process of converting a sequence of characters (such as in a computer program or web page) into a sequence of tokens (strings with an assigned and thus identified meaning). A program that performs lexical analysis may be termed a lexer, tokenizer, or scanner, though scanner is also a term for the first stage of a lexer. A lexer is generally combined with a parser, which together analyze the syntax of programming languages, web pages, and so forth.

More specifically, a lexer is a software program that performs lexical analysis. Lexical analysis is the process of separating a stream of characters into different words, which in computer science is termed "tokens." A parser goes one level further than the lexer and takes the tokens produced by the lexer and tries to determine if proper sentences, in the computer science sense, have been formed. Parsers work at the grammatical level, lexers work at the word level. When a document is "lexed" it is broken into tokens. When a document is "parsed" the result is the extraction of information from the document. Generally lexing proceeds parsing and most parsers include a lexer. So, for example a sentence lexer would take a block of text and break it into sentences by determining where the sentence breaks are. A sentence parser would take as input the output of the sentence lexer and create a structure that describes how the concepts in the sentence relate (something akin to a sentence diagram). As another example many XML parsers parse an XML document into a DOM (a tree like structure that contains all the information from the document in its structured form). In the process one would lex the input stream into tokens that the parser then uses to create the DOM. There exists another type of XML "parser" called a SAX parser. This parser may be viewed as a lexer that breaks the input stream into tokens and then utilizes the calling implementation to create the meaningful output.

SUMMARY

The present invention provides a method for comparing at least two structured data files. A computer polls at least one network device for data files. The computer determines a structural difference between a first data file and a second data file and creates at least one patch file based on the structural difference. The computer extracts at least one span from the at least one patch file, wherein the at least one span is defined by a starting point byte and a length measured in bytes. The computer performs a lexer operation using the at least one span as a limiting criterion to limit an output of the lexer to statements that include the at least one span. The computer outputs the statements indicating changes in a configuration between said first and second data files.

Other forms of the embodiment of the method described above are in a system and in a computer program product.

BRIEF DESCRIPTION OF THE DRAWINGS

A better understanding of the present invention can be obtained when the following detailed description is considered in conjunction with the following drawings. The accompanying drawings are not intended to be drawn to scale. In the drawings, each identical or nearly identical component that is illustrated in various figures is represented by a like numeral. For purposes of clarify, not every component may be labeled in every drawing. In the drawings.

DETAILED DESCRIPTION

Figure 1:
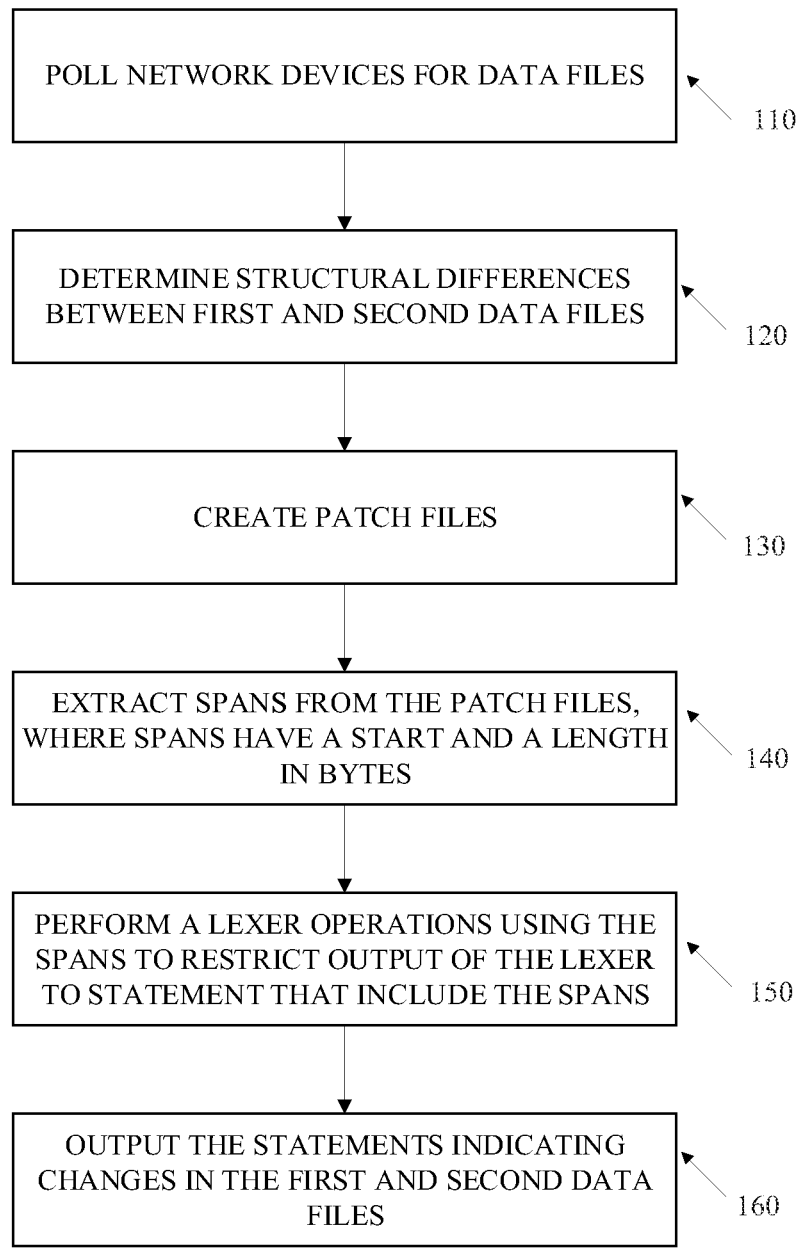
FIG. 1 is a flowchart illustrating the steps to accomplish the method of comparing at least two different structured data file according to an embodiment of the present invention.

For purposes of this disclosure, a lexer is considered to be a program that takes a stream of bytes of computer code and segments the stream of bytes into "statements". In classical lexers, the statements would be words; however, this disclosure recognizes that sentence-like structures or a list of linked nodes might just as well be returned. For purposes of this disclosure, any such output will be considered as a statement.

As described in detail below, a span may technically be considered to be segmented output of a lexer but, more importantly, a span is a collection of adjacent bytes that includes: (1) a starting point (byte offset in a stream) and (2) a length measured in bytes, identifying a portion of the input stream of interest. From the lexers perspective, the spans are the subsections of the input stream being analyzed.

In network device configuration, one typically considers very large configuration files (on the order of GB). When a change occurs in the file, the system needs to extract all "statements" as returned by the lexer that are impacted. An example of multiple lexed statements being impacted would be a change to an element/attribute in an XML document, which means that all statements that include any children of the changed element are impacted. This invention provides a way to use one or more spans to restrict the output of the lexer so that the lexer outputs only statements that include the spans. Such a lexer would allow the system to identify significant changes to very large configuration files, and notify interested parties of changes and potential impact of changes.

Thus, the present invention restricts output of the lexer to statements that are of interest based on spans in the input stream, even when the statements are constructed from disjointed spans of the input document.

Conventional lexers are concerned with starting at a location other than the start of the file and ending at some point before the end of the file. The invention is distinguished from the conventional techniques in that, contrary to the conventional lexers, the invention is not concerned with starting in a known point in the output and moving forward to a known endpoint in the output. The present invention, on the other hand, is concerned with finding the statements that are impacted by changes in regions in the input stream.

Incremental lexers are also known that allow the lexer to produce partial output, backup or move forward, and continue. These incremental lexers are used by compilers to parse code. The present invention, on the other hand, produce statements for the entire input stream but limit the output to only those statements that are impacted by one or more spans.

No known system provides a mechanism to take a series of spans that describe changed locations in an input stream and the input stream itself to produce only statements that have changed. For some lexers this is a one-to-one match (e.g. a lexer that highlights a text file) process, while for other lexers this is far more complex. A complex example is the XML lexer that produces XPath like statements to leaf nodes, in this case changes to elements and properties in the up the tree result in multiple statements from the lexer.

The present invention begins with a system or computer program that polls network devices and pulls or extracts certain configurations from which the system or program generates diff files (i.e., structural differences) for devices or programs the system has examined in the past. Based on the diff files, patch files are created and send for further parser processing. The parser is used to extract statements that were changed as identified by the changes in the configuration. It is noted that the present invention utilizes byte rather than characters for the diff calculations.

As previously noted, the present invention utilizes spans to restrict the operation of the lexer. Spans are a logical construct having a start and a length measured in bytes. The system utilizes one or more filter spans that delineate the areas of change in an input stream and the stream in question. The input stream is processed as normal for the lexer except that the invention tracks which sections (spans) of the input stream contributed data to the output. When a candidate statement is created, the invention checks to see if any of the input spans and filter spans overlap. If so then the statement is output. If not the statement is skipped and the next candidate generated.

The invention extracts spans from the patch files because they are part of the data of the patch file, but the concept of creating spans based on patch files and utilizing the spans during the lexer process is not known. The present invention uses the spans to limit or restrict the lexer so that the lexer only emits or statements that include the spans which dramatically simplifies the change-analysis process.

In accordance with the present invention, the lexer starts by creating an ordered list of the filter spans. The lexer then starts processing the file. Depending on the data type (e.g. LDIF, XML, semi-structured text) the lexer creates an input span for each block of data (XML element, semi-structured line, etc.) and stores the span with the text. When the lexer determines that it has reached the end of a statement, each of the input spans is compared against the list of filter spans. If the input span intersects at least one filter span, the statement is output. The LDAP Data Interchange Format (LDIF) is a standard plain text data interchange format for representing LDAP (Lightweight Directory Access Protocol) directory content and update requests. LDIF conveys directory content as a set of records, one record for each object (or entry). Extensible Markup Language (XML) is a markup language that defines a set of rules for encoding documents in a format which is both human-readable and machine-readable. Semi-structured data is a form of structured data that does not conform with the formal structure of data models associated with relational databases or other forms of data tables, but nonetheless contains tags or other markers to separate semantic elements and enforce hierarchies of records and fields within the data.

The present invention may be implemented for semi-structured configurations as well as for a generic XML structure, but it may be equally applied to all relevant configurations and structure noted for lexical analysis.

In accordance with the invention, the system takes two files and creates a binary difference between them. The system then creates a patch file in the format used by Unix Patch. Using the patch file and either of the two input files, the system can extract the statements that were changed from the files.

Now that the system has the statements that were changed, the system can determine what parts of the configuration changed. Generic differences only provide line number differences which can be meaningless to users where the configuration is very large (e.g., 500 MB or greater isn't unusual). This invention determines what part of the configuration changed and can then alert interested parties.

Thus, the present invention provides a unique method that notifies a user when change occurs between documents and focuses on where relevant changes are found.

The present invention will now be described with reference to the following text samples: Statement (Text) 1: "Now is the time for all good men to come to the aid of their country" and Statement (Text) 2: "Then was the time for all good women to come to the aid of their people."

As one may readily discern from this simplified example, the difference between the two statements is the words "Now is" versus "Then was," "men" versus "woman," and "country" versus "people". A patch for the above statement showing the difference there between would read as follows:
Patch
@@-1,5+1,8
 −Now is
 +Then was
 the time
@@-30,0+32,2
 good
 +wo
 men
@@-62,6+64,6
 their
 −country
 +people The system further identifies one or more filter spans that delineate the areas of change in an input stream and the stream in question. An example would be a patch file and the result of applying the patch. The patch file specifies byte offsets and lengths of changes (these are effectively spans). By using the spans, the system can determine which parts of the file changed. The system uses this patch file in detecting changes in configuration files.

In the example above, the spans for the second statement or text are (1,8), (32,2) and (64,6).

Next, the system will create an ordered list of the filter spans. The above list is ordered properly, because it is listed from the first span to the last span. Next, the system will identify which input spans contributed data to the output. Here, all spans in this example contribute to the output.

However, in a longer example there might be "comment" lines that would not be output and changes in the comment lines would be skipped.

In accordance with the invention, if the input span (which contributed data to the output) intersects at least one filter span, the statement is output. Next, the system will lex the input lines into words broken by whitespace or punctuation. The output (e.g., the listing word and span for the word) for the second statement would thus be:
"Then" (1,4)
"was" (6,3)
"the" (10,3)
"time" (14,4)
"for" (19,3)
"all" (23,3)
"good" (27,4)
"women" (32,5)
"to" (38,2)
"come" (41,4)
"to" (46,2)
"the" (49,3)
"aid" (52,3)
"of" (55,2)
"their" (58,5)
"people" (64,6)

Now, the system will apply the spans from the step above: (1,8), (33,2) and (64,6) and the output is: "Then", "was", "woman", "people" which represent the changes between Statement 1 and Statement 2.

The foregoing example is a simplified one. More complex examples exist with XML documents and other structured documents. Assume and XML tree like the following:

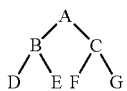

A lexer will produces "x" paths to the leaf nodes as follows: A/B/D; A/B/E; A/C/F; and A/C/G.

If one were to change "B" to "b" the output of the lexer would be A/b/D and A/b/E.

As noted above, the present invention filters out all the unchanged elements. In fact, with the lexer according to the present invention, except in specific edge cases, you would not be able to construct the full XML document.

In the present invention, the system is lexing large documents (often 10s to 100s of MB in size) down to a few changed tokens. The system then passes the tokens through a classifier (similar to a parser) that tells us what the tokens mean. From there the system performs actions based on a change in a classification between the two documents.

FIG. 1 is a flowchart illustrating the steps to accomplish the method of comparing at least two different structured data file according to an embodiment of the present invention. The present invention provides a unique method that notifies a user when change occurs between documents and focuses on where relevant changes are found by utilizing spans to limit or strict the output of the parser/lexer process. The present invention utilizes a computer system of processors and memory as will be described below with respect to FIGS. 2-5 and begins at step 110 by polling network device(s) for data files. At step 120, the system determines structural differences (i.e., diffs) between related first and second data files, whereby the system generates diffs for devices or programs it has seen before by denoting the structural differences between the first and second data files. At step 130, the system creates patch files such as those described above under the heading "Patch." At step 140, the system extracts spans from the patch files, where the spans are defined in bytes by a starting point and a length. In other words, the system determines or creates one or more filter spans that delineate the characters that define the data file; e.g., words and their spans i.e., their beginning and length. As part of step 140, the system creates an ordered listing of the at least one span, wherein the ordered listing includes the starting point byte and the length measured in bytes that are ordered according to predetermined criteria determined by an operator.

Next, at step 150 the system performs a lexer operation using the spans to restrict or limit an output of the lexer to statements that include the spans, wherein the statements indicate or delineate changes in the configuration between the first and second data files. Thus, the invention performs a lexer operation using the span(s) as limiting criteria to limit an output of the lexer to statements that include the span(s). By limiting the lexer operation in this manner the output of the lexer are the subsections of the input stream that the user is interested in examining because it represents the changes or differences being examined. A span is a collection of adjacent bytes with a starting offset and a length. From the lexers perspective, these spans are the subsection of the input stream representing change and/or differences between the two data files being compared.

Lastly, at step 160 the system outputs the statements that are indicative of changes between the first and second data files. The put may be a computer generated image or may be a print-out or other suitable means to determine the results of the process described above.

Thus, the system identifies one or more overlapping spans that delineate the areas of change in an input stream and the stream in question for two related data files. The patch file specifies byte offsets and lengths of changes; i.e., the effective spans. By using the spans, the system can determine which parts of the file changed. The system uses the patch file in detecting changes in configuration files in manner that effectively processes large data files.

Figure 2:
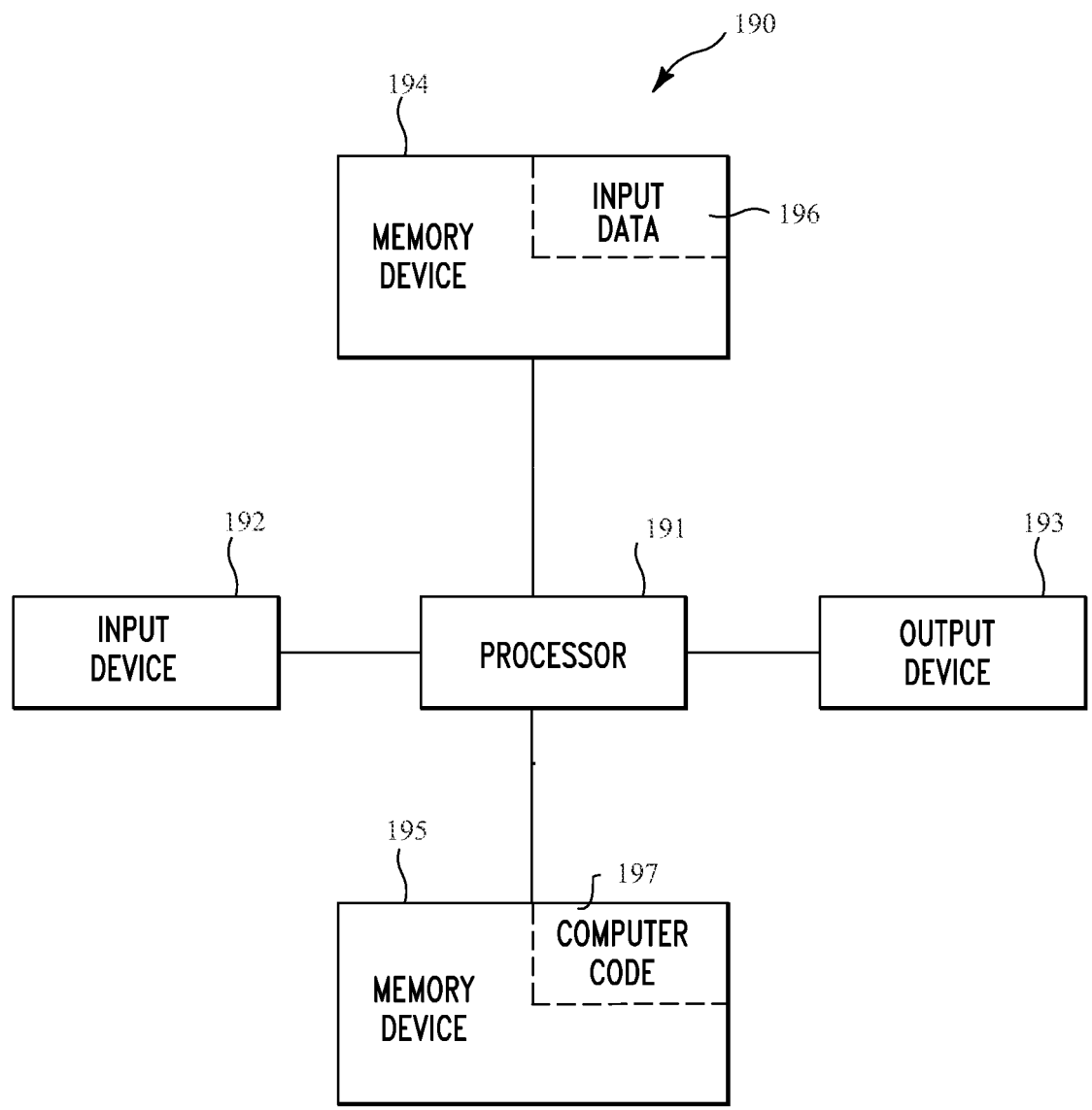
FIG. 2 illustrates a computer system used for implementing the methods of the present invention.

FIG. 2 illustrates a computer system 190 used for implementing the methods of the present invention. The computer system 190 includes a processor 191, an input device 192 coupled to the processor 191, an output device 193 coupled to the processor 191, and memory devices 194 and 195 each coupled to the processor 191. The input device 192 may be, inter alia, a keyboard, a mouse, etc. The output device 193 may be, inter alia, a printer, a plotter, a computer screen, a magnetic tape, a removable hard disk, a floppy disk, etc. The memory devices 194 and 195 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 195 includes a computer code 197 which is a computer program that includes computer-executable instructions. The computer code 197 includes software or program instructions that may implement an algorithm for implementing methods of the present invention. The processor 191 executes the computer code 197. The memory device 194 includes input data 196. The input data 196 includes input required by the computer code 197. The output device 193 displays output from the computer code 197. Either or both memory devices 194 and 195 (or one or more additional memory devices not shown in FIG. 2) may be used as a computer usable storage medium (or program storage device) having a computer readable program embodied therein and/or having other data stored therein, wherein the computer readable program includes the computer code 197. Generally, a computer program product (or, alternatively, an article of manufacture) of the computer system 190 may include the computer usable storage medium (or said program storage device).

The processor 191 may represent one or more processors. The memory device 194 and/or the memory device 195 may represent one or more computer readable hardware storage devices and/or one or more memories.

Thus the present invention discloses a process for supporting, deploying and/or integrating computer infrastructure, integrating, hosting, maintaining, and deploying computer-readable code into the computer system 190, wherein the code in combination with the computer system 190 is capable of implementing the methods of the present invention.

While FIG. 2 shows the computer system 190 as a particular configuration of hardware and software, any configuration of hardware and software, as would be known to a person of ordinary skill in the art, may be utilized for the purposes stated supra in conjunction with the particular computer system 190 of FIG. 2. For example, the memory devices 194 and 195 may be portions of a single memory device rather than separate memory devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

In embodiments, the computer or computer system may be or include a special-purpose computer or machine that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

It is understood in advance that although this disclosure includes a detailed description on conventional networks and cloud computing networks, implementation of the teachings recited herein are not limited to any particular computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization and may be managed by the organization or a third party and may exist on-premises or off-premises.

Community cloud: the cloud infrastructure is shared by several organizations and supports a specific community that has shared concerns (e.g., mission, security requirements, policy, and compliance considerations) and may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
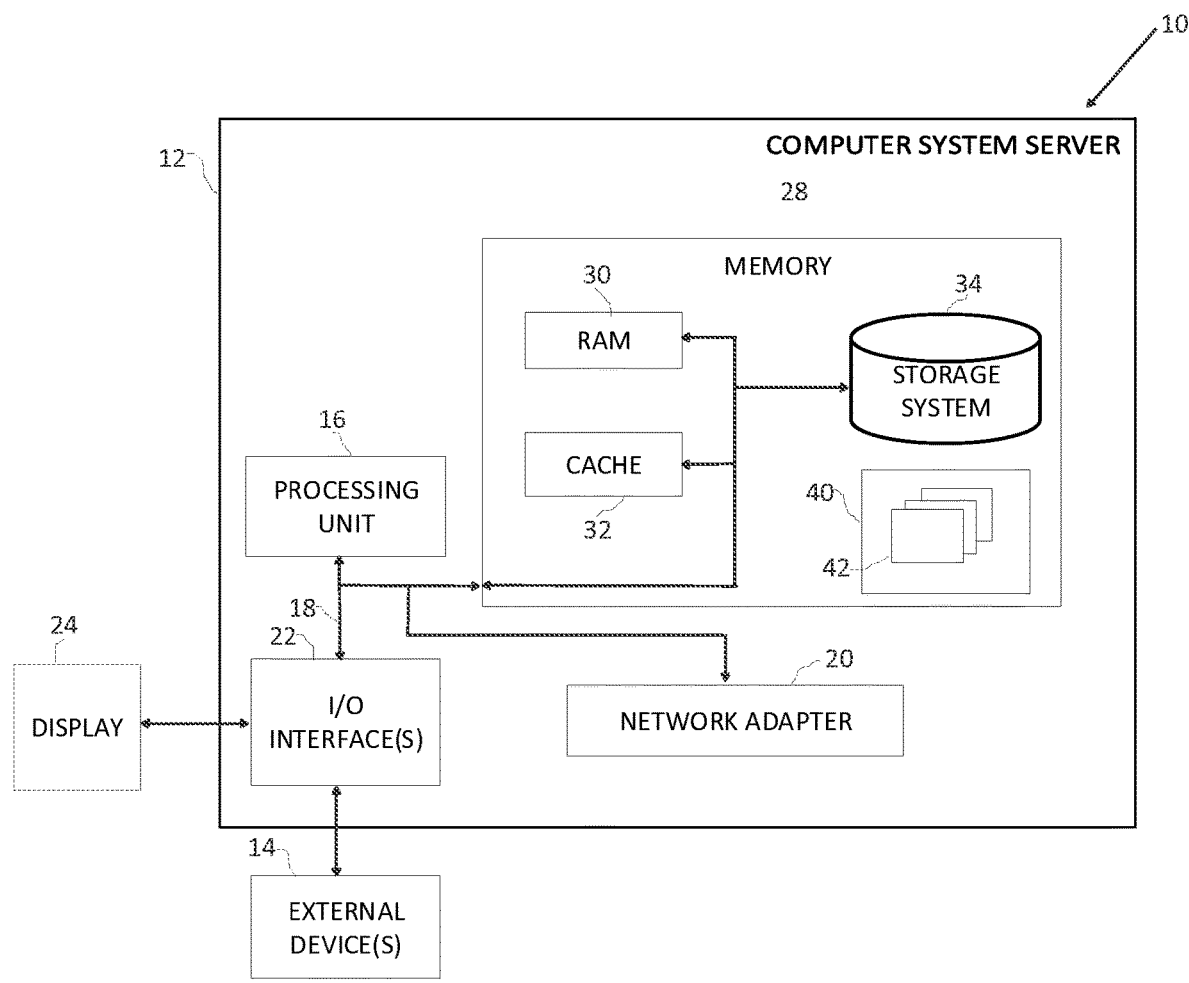
FIG. 3 depicts a cloud computing node according to an embodiment of the present invention.

FIG. 3 depicts a cloud computing node according to an embodiment of the present invention. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12 and may include both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
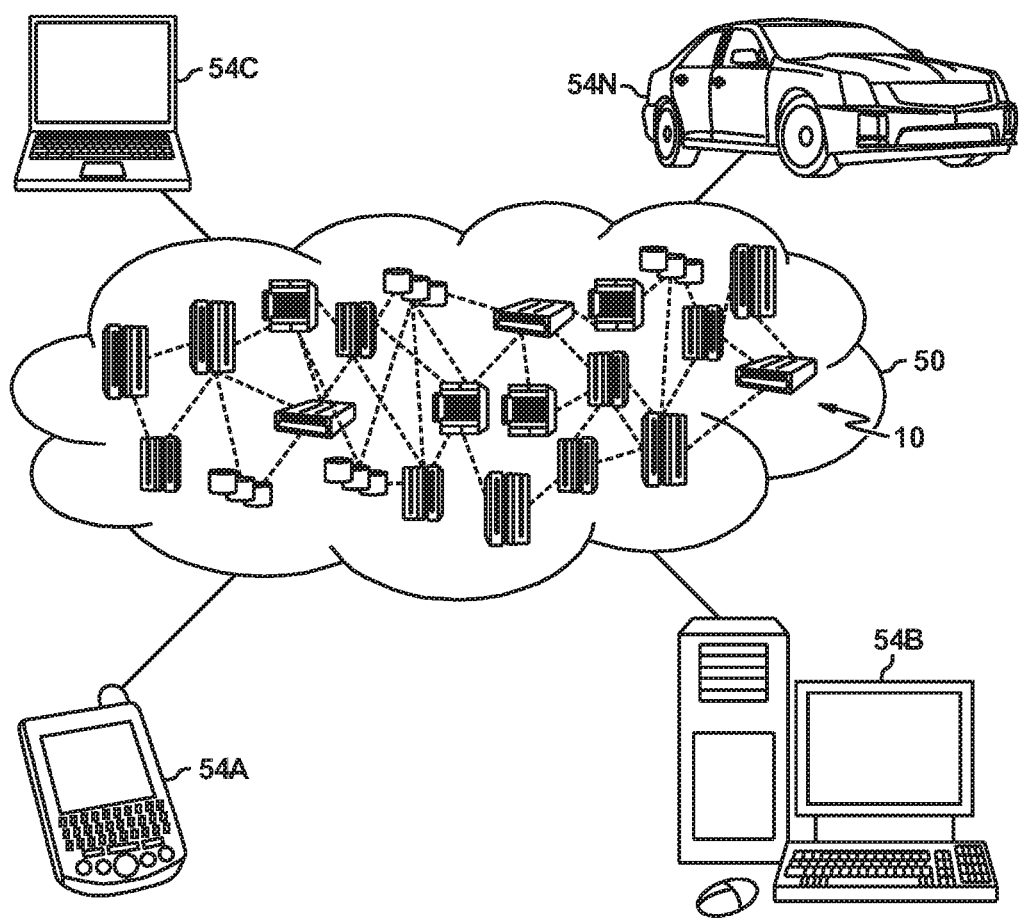
FIG. 4 depicts a cloud computing environment according to an embodiment of the present invention.

FIG. 4 depicts a cloud computing environment according to an embodiment of the present invention. Referring now to FIG. 4, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another and may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
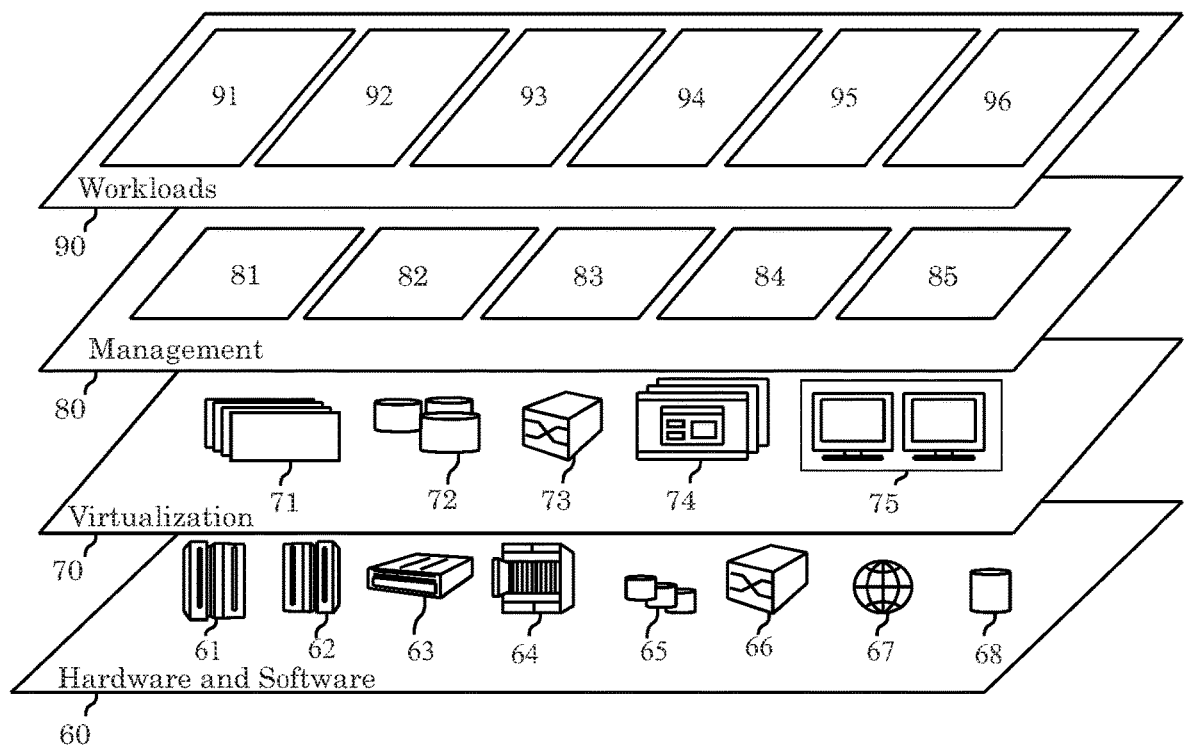
FIG. 5 depicts abstraction model layers according to an embodiment of the present invention.

FIG. 5 depicts abstraction model layers according to an embodiment of the present invention. Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the system 96 to determine brand loyalty using location and micro-location detection according to the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of operating a lexer, comprising:
   providing an input stream and a stream in question;
   providing a patch file specifying differences between the input stream and the stream in question, wherein the patch file includes at least one filter span;
   processing, by a processor, the stream in question, wherein the step of processing comprises creating a plurality of input spans for the stream in question;
   determining, by the processor, that at least one input span of the plurality of input spans contributes data to an output;
   determining, by the processor, that the at least one input span that contributes data to the output intersects the at least one filter span; and
   emitting, by the processor, a statement for the determined at least one input span that contributes data to the output.

2. The method of claim 1, wherein no statement is emitted for input spans of the plurality of input spans that are at least one of determined to not contribute data to the output and determined to not correspond to the at least one filter span.

3. The method of claim 1, further comprising:
   extracting the at least one filter span from the patch file; and
   creating an ordered listing of the at least one filter span.

4. The method of claim 1, wherein the patch file is based on a structural difference file, wherein the structural difference file includes differences between the input stream and the second stream.

5. The method of claim 4, further comprising:
   providing the structural difference file.

6. The method of claim 4, wherein the emitted statement for the determined at least one input span of the input stream results in an output of only the differences between the input stream and the second stream.

7. The method of claim 1, wherein the step of processing further comprises comparing each respective input span of the plurality of input spans to a list of filter spans.

8. The method of claim 1, wherein the step of emitting a statement for the determined at least one input span of the input stream comprises emitting the change delineated by the at least one filter span.

9. A computer program product comprising:
   a computer-readable storage device; and
   a computer-readable program code stored in the computer-readable storage device, the computer readable program code containing instructions executable by a processor of a computer system to implement a method of operating a lexer, the method comprising:
   providing an input stream and a stream in question;
   providing a patch file specifying differences between the input stream and the stream in question, wherein the patch file includes at least one filter span;
   processing the stream in question, wherein the step of processing comprises creating a plurality of input spans for the stream in questions;
   determining that at least one input span of the plurality of input spans contributes data to an output;
   determining that the at least one input span that contributes data to the output intersects the at least one filter span; and
   emitting a statement for the determined at least one input span that contributes data to the output.

10. The computer program product of claim 9, no statement is emitted for input spans of the plurality of input spans that are at least one of determined to not contribute data to the output and determined to not correspond to the at least one filter span.

11. The computer program product of claim 9, the method further comprising:
    extracting the at least one filter span from the patch file; and
    creating an ordered listing of the at least one filter span.

12. The computer program product of claim 9, wherein the patch file is based on a structural difference file, wherein the structural difference file includes differences between the input stream and the second stream.

13. The computer program product of claim 12, the method further comprising:
    providing the structural difference file.

14. The computer program product of claim 12, wherein the emitted statement for the determined at least one input span of the input stream results in an output of only the differences between the input stream and the second stream.

15. The computer program product of claim 9, wherein the step of processing further comprises comparing each respective input span of the plurality of input spans to a list of filter spans.

16. The computer program product of claim 9, wherein the step of emitting a statement for the determined at least one input span of the input stream comprises emitting the change delineated by the at least one filter span.

17. A computer system, comprising:
    a processor;
    a memory coupled to said processor; and
    a computer readable storage device coupled to the processor, the storage device containing instructions executable by the processor via the memory to implement a method for comparing at least two structured data files, the method comprising:
    providing an input stream and a stream in question;
    providing a patch file specifying differences between the input stream and the stream in question, wherein the patch file includes at least one filter span;

processing the stream in question, wherein the step of processing comprises creating a plurality of input spans for the stream in question;

determining that at least one input span of the plurality of input spans contributes data to an output;

determining that the at least one input span that contributes data to the output intersects the at least one filter span; and emitting a statement for the determined at least one input span that contributes data to the output.

18. The computing system of claim 17, no statement is emitted for input spans of the plurality of input spans that are at least one of determined to not contribute data to the output and determined to not correspond to the at least one filter span.

* * * * *